G. L. REICHHELM.
STAMP VENDING AND AFFIXING MACHINE.
APPLICATION FILED FEB. 21, 1911.

1,274,448.

Patented Aug. 6, 1918.
7 SHEETS—SHEET 2.

Witnesses:
John Enders
C. C. Dunap

Inventor:
George L. Reichhelm,
by Sheridan, Wilkinson, Scott & Richmond,
Attys.

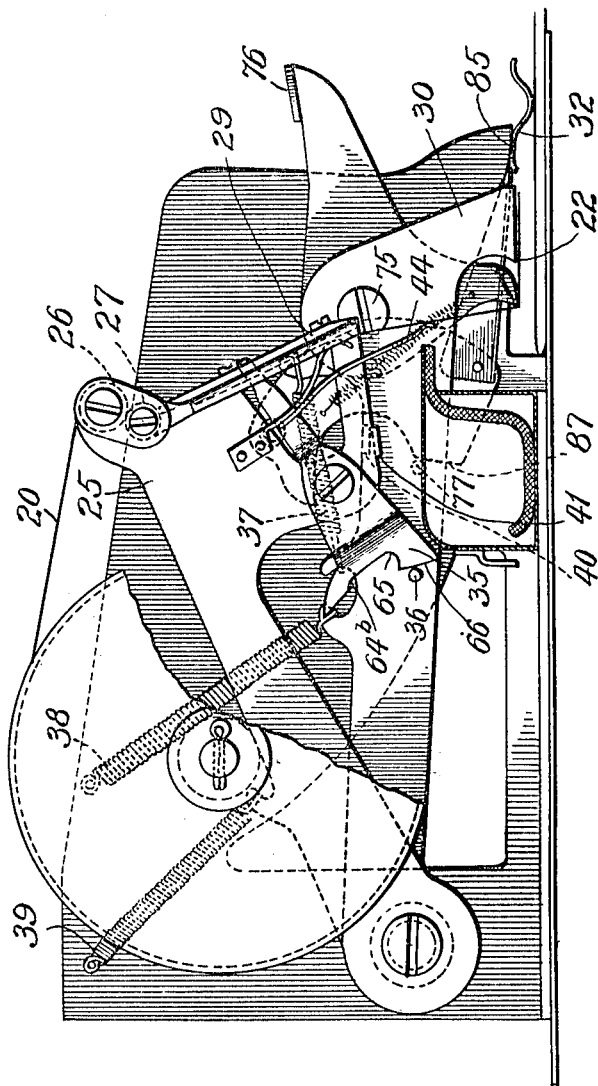

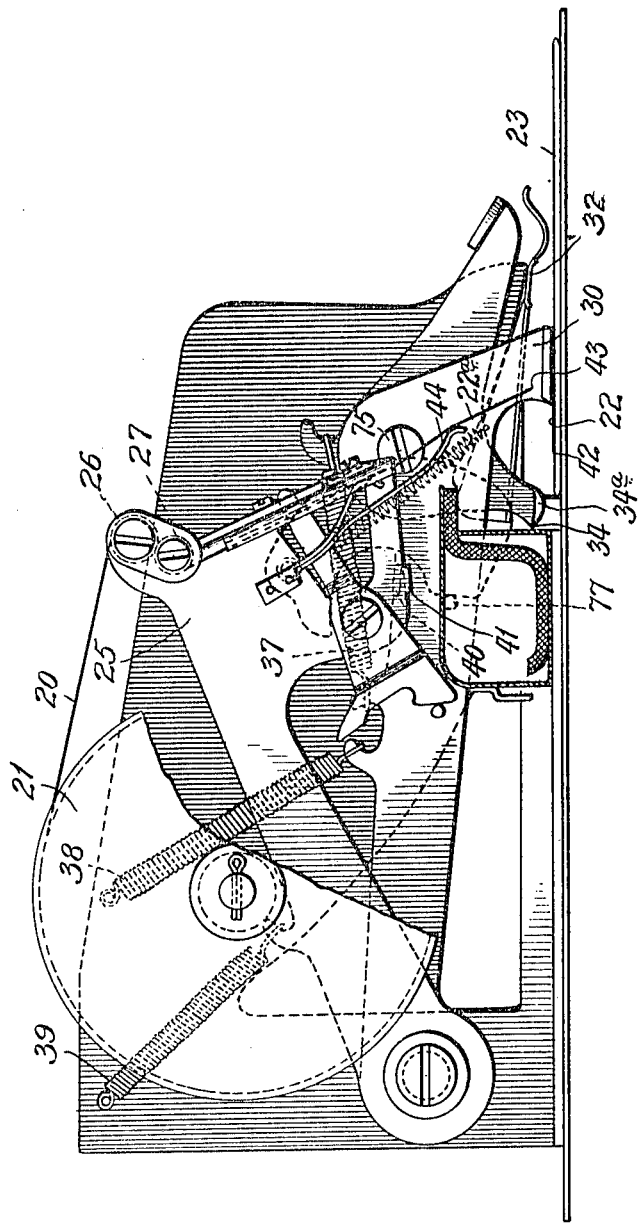

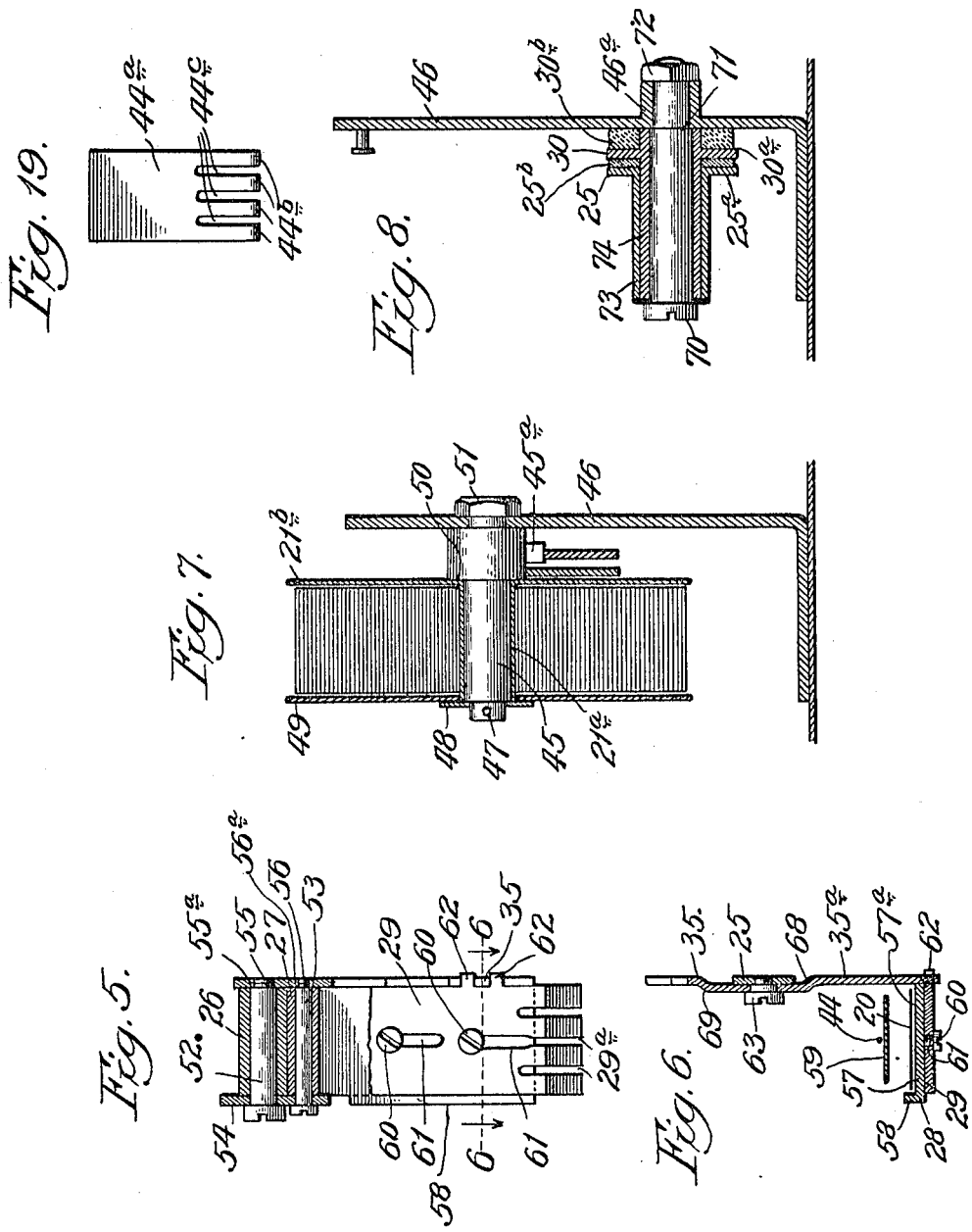

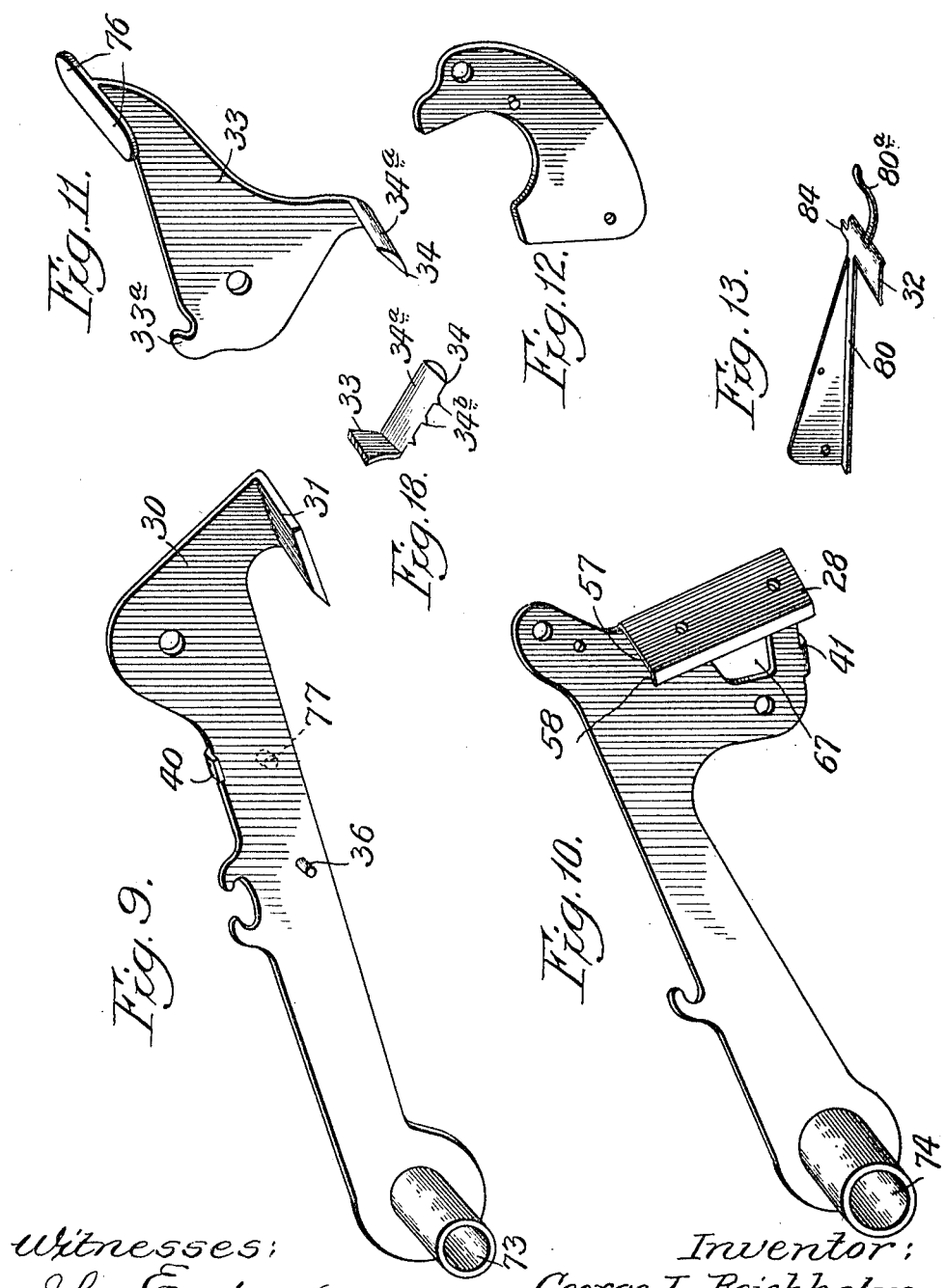

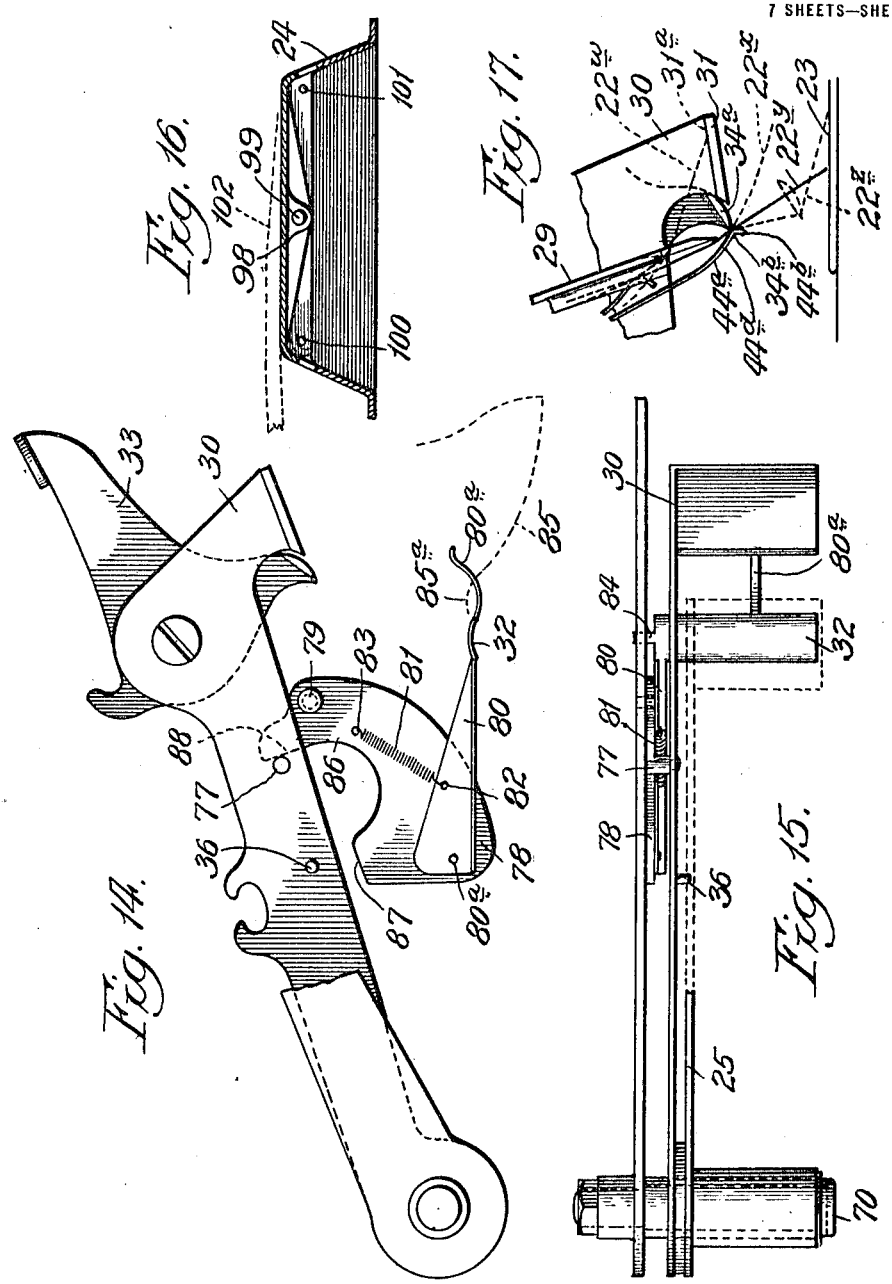

UNITED STATES PATENT OFFICE.

GEORGE L. REICHHELM, OF DETROIT, MICHIGAN, ASSIGNOR, BY MESNE ASSIGNMENTS, TO P. R. MANUFACTURING COMPANY, OF DETROIT, MICHIGAN, A CORPORATION OF MICHIGAN.

STAMP VENDING AND AFFIXING MACHINE.

1,274,448.   Specification of Letters Patent.   Patented Aug. 6, 1918.

Application filed February 21, 1911. Serial No. 609,881.

*To all whom it may concern:*

Be it known that I, GEORGE L. REICHHELM, a citizen of the United States, residing at Detroit, in the county of Wayne and State of Michigan, have invented certain new and useful Improvements in Stamp Vending and Affixing Machines, of which the following is a specification.

The object of my invention is to provide a simple and efficient mechanism for delivering and affixing postage stamps, labels, or similar articles, to envelops, packages, and the like.

My invention includes a number of novel constructions and combinations of elements, which very effectively produce the results sought. They will be fully described in the following specification and set forth in the claims. Other objects and advantages of my new mechanism will become more fully apparent in the said specification when taken in connection with the accompanying drawings, in which—

Fig. 3 is a side elevation of the same mechanism, with the parts in the position which they occupy at the end of the third step in the operation. In this step the affixing lever has reached a position which is about a quarter of an inch from the base of the machine. In this position of the parts a lug on the affixing lever has reached a lug on the bender-plate carrier.

Fig. 4 is a side view of the same mechanism showing the parts in the position they finally occupy when the affixing lever is pressing the stamp firmly against the envelop and the severing lever has moved to its lowermost position. In this position of the parts the bender-plate carrier has also been moved downwardly a short distance.

Figure 1:
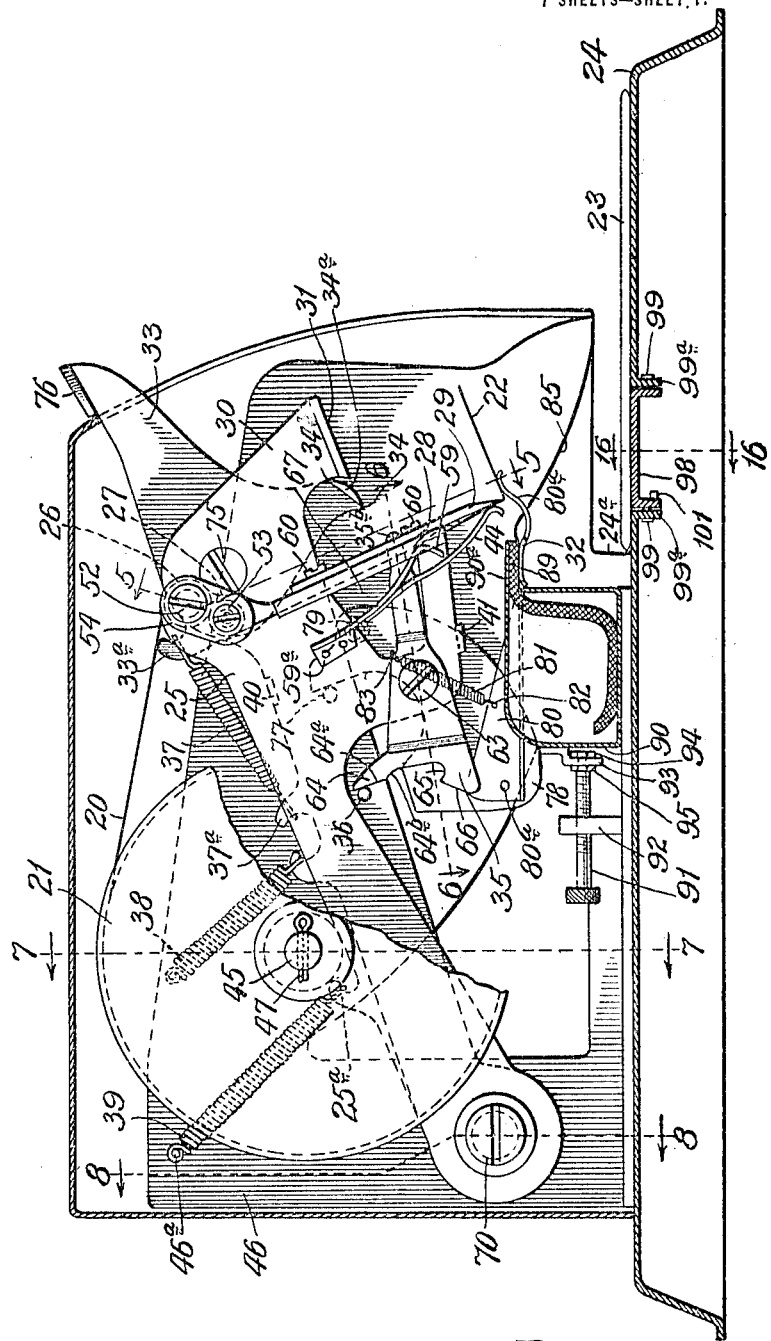
Figure 1 is a side elevation of the greater portion of the mechanism, with the casing, the base, and certain other parts shown in section. In this figure the parts are shown in their normal position, as they would appear when the machine is not being operated.

Fig. 5 is a sectional view taken along the line 5—5 of Fig. 1, and showing the bender-plate and a sectional view of the tension rollers.

Fig. 6 is a sectional view taken along the line 6—6 of Fig. 1, showing chiefly the relation of the bender-plate-actuating lever and its relation to the bender-plate and bender-plate carrier.

Fig. 7 is a vertical section taken along the line 7—7 of Fig. 1, showing principally the reel and its mode of attachment to the frame.

Fig. 8 is a sectional view along the line 8—8 of Fig. 1, showing chiefly the pivotal support of the affixing lever and bender-plate carrier.

Fig. 9 is a perspective view of the affixing lever.

Fig. 10 is a perspective view of the bender-plate carrier.

Fig. 11 is a perspective view of the severing lever.

Fig. 12 is a perspective view of the wiper lever.

Fig. 13 is a perspective view of the wiper.

Fig. 14 is a detail showing the relation of the affixing lever, wiper lever, and wiper when in their normal positions.

Fig. 15 is a plan view of the same; and

Fig. 16 is a cross section of the base of the machine, taken along the line 16—16 of Fig. 1.

Fig. 17 shows a modification in the stamp engaging and severing parts.

Fig. 18 is a perspective view of a modification of the severing lever.

Fig. 19 shows a modification of one of the parts.

Referring more particularly to Fig. 1 of the drawings, my invention will be seen to comprise mechanism by which the ribbon or strip of stamps 20 is operated upon in such a manner as to deliver and affix one of said stamps upon the envelop or like package 23. The envelop may be supported during the operation by the base 24.

An essential feature of my invention consists in mechanism for bending the first or end stamp 22 of the ribbon or strip 20 to a position at an angle with said strip. With the end stamp in this position it is very conveniently and effectively engaged by moistening and affixing mechanism, which will be more fully described later.

The ribbon of stamps is preferably supplied to the machine in the form of a coil or roll, which is placed upon the reel 21. This reel may be removed for the insertion of a new roll of stamps, and readily replaced in the machine.

The ribbon of stamps is threaded through certain feeding and controlling mechanism, which is carried in a great measure by the pivoted lever 25. This pivoted lever I preferably call the bender-plate-carrying lever, for reasons which will presently appear.

Upon the bender-plate-carrying lever 25 are mounted rollers 26 and 27, around which the ribbon passes on its way to the delivering and affixing mechanism. In passing around these rollers the ribbon makes what may be termed a double turn. It first passes around one of the rollers, then passes between the rollers, and finally makes another turn around the second roller.

The ribbon then passes through a channel-shaped lateral projection 28 upon the lever 25. It finally passes below and around the lower extremity or edge of the bender plate 29.

The end stamp 22 is bent around the lower extremity of the bender-plate, by mechanism which will be more fully described later, to an angular position with relation to the body of the ribbon. When in this position it lies in the path of an affixing member or lever 30, which has a laterally projecting flat portion 31, adapted to engage the face of the stamp 22 and carry it downwardly to the envelop or package 23.

Another important element of my invention consists in the wiper 32, which serves the chief purpose of carrying moisture to the under or gummed surface of the stamp. This wiper also has another important function to perform, which consists in exerting a pressure upon the under side of the stamp and causing a more effective engagement of the affixer therewith during its downward movement.

Another important element of my invention is the severing lever 33, which is pivotally attached to the affixing lever 30. This severing lever is provided with a cutting edge 34 at its lower extremity, which lies in the same plane with the surface 31 of the affixer in its normal position. The severing lever 33 serves also to receive the actuating pressure of the operator's hand, and transmits said pressure to the affixing lever 30 through the pivotal connection with said affixing lever and through a spring 37, as will be more fully described later.

The bender-plate-actuating lever 35 is pivotally attached to the lever 25, and is adapted to give a reciprocating movement to the bender-plate 29. This lever is actuated by a pin 36 carried by the affixing lever 30.

A spring 38 is adapted to raise the affixing lever 30. This spring is attached at one end to said lever 30 and at the other end to the frame 46. This spring is so proportioned with relation to the strength of the spring 37 that when pressure is applied to the lever 33 the spring 38 will yield before the spring 37 yields. The spring 37 is attached at one end to a lug 37$^a$ on the lever 30, and at the other end to a lug 33$^a$ on the lever 33.

The spring 39 is attached to the bender-plate carrying lever 25 by means of a lug 25$^a$, and at the other end to the frame 46 by means of a pin 46$^a$. The spring 39 is adapted to hold the bender-plate-carrying lever 25 in its elevated position, as shown in Fig. 1, until a lug 40, projecting laterally from the affixing lever 30, strikes an opposing lug 41 on said lever 25. The further downward movement of the affixing lever causes the tension of the spring 39 to be overcome and the lever 25 to be moved downwardly. The downward movement of the lever 25 will be never greater than about one-fourth of an inch, as shown by two consecutive positions of said levers occurring in said Figs. 3 and 4.

Another element of my mechanism which I will mention at this time is a small wire spring or finger 44, which is adapted to press a new stamp 22$^a$ (Fig. 4) forwardly a small distance after its end 43 has been severed from the end 42 of the preceding stamp 22. The purpose of this is to carry the end of the stamp 43 over the lower portion 34$^a$ of the severing lever into a position where it will be bent forwardly thereby in the return movement of the severing lever 33.

Thus far some of the essential parts of my invention have been enumerated briefly for the purpose of making the following description more easily comprehended. The balance of the specification will be more exhaustive in the matter of details.

Referring again to the reel 21, it will be seen to be supported by a pin 45, which is fixed to the main frame 46 by a nut 51. The reel is preferably composed of a central sleeve 21$^a$ integral with a side plate or disk 21$^b$. Another disk 49, having a central aperture, may be placed over the end of the sleeve 21$^a$. A washer 48, fitting over the reduced end of the pin 45, may be held in place against the shoulder thus formed, by a split pin 47, or any other suitable or convenient means.

The purpose of the above arrangement of parts is to facilitate convenient renewal of the roll of stamps.

The rollers 26 and 27 are preferably mounted on the pins 52 and 53, which are threaded at 55 and 56 into the body of the bender-plate-carrying lever 25. The pins are shouldered against said lever, as shown at 55ª and 56ª. The outer ends of the pins 52 and 53 are held in proper relation, or spaced, by a small oval plate 54.

After passing between the rollers 26 and 27, the ribbon enters a groove or channel 57ª, formed in the laterally projecting portion 57 of the lever 25. This channel is formed between the lip 58 at the outer edge and the main body of the lever at the other side.

The ribbon 20 is held in position in this groove by the flat spring member 59, which is secured to the lever 25 by the rivets 59ª. This spring member 59 bears upon the ribbon with a pressure sufficient to hold it in place while the feeding of the ribbon is being effected and while the bender-plate 29 is being actuated and other operations are being performed upon it.

The bender-plate 29 is fitted to the outer face of the laterally projecting portion 57 and is held in position thereon and guided by screws 60. These screws enter slots 61 in the bender-plate, and thereby serve as guides. The bender-plate is provided with lateral projections or lugs 62, between which the end of the lever 35 is inserted. This lever is pivotally attached to the lever 25 by a pin 63, which is threaded in said lever 25 and shouldered against the same. The lever 35 is provided with an upwardly projecting arm or tongue 64, having a face 64ª which is normally perpendicular to a radius extending through the pin 36 and the pivotal center 70 of the affixing lever 30. This pin 36, therefore, normally holds the bender-plate 29 in its lowermost position, as shown in Fig. 1.

The downward movement of the bender-plate serves to produce a final feeding movement of the stamps, as will appear later in this specification. The stamp 22 is moved by said plate to the proper position for the engagement of the affixing lever 30 therewith and for the tongue 80ª to hold the stamp against the face 31 of said lever.

The downward movement of the plate 29 is effected by the pin 36 when it strikes the curved shoulder 64ᵇ of the lever 35.

The lever 35 is also provided with a notch or shoulder 65, which lies in the path of the pin 36 when the lever 30 moves downwardly. By this means the lever 35 is given an oscillation which effects an upward movement of the bender-plate 29 preparatory to a subsequent feeding movement of the ribbon.

The bender-plate-actuating lever 35 is also provided with a face 66, along which the pin 36 slides after it has moved out of the notch 65. This permits further movement of the pin 36 after it has given the desired extent of movement to the lever 35. The face 66 has the further function of retaining the lever 35 in a desired position which will support the bender-plate in its elevated position during the extreme lower portion of the movement of said pin 36. (See Figs. 3 and 4).

The bender-plate lever 35 is given two off-sets 68 and 69 (Fig. 6) to permit it to pass around the upright portion of the lever 25 and to lie in the plane thereof. The arm 35ª of said bender-plate lever occupies an opening 67 in the lever 25, and its reduced end 35ᵇ enters the space between the lugs 62, previously described. It is adapted to slide between the said lugs when it is imparting a reciprocating movement to the bender-plate.

The affixing lever 30 is preferably pivotally mounted upon the pin 70, which is fixed to the frame 46. The pin preferably is shouldered at 71 into a boss 46ª and is securely held in position by a nut 72. The lever 30 is provided with a sleeve or hub 74, of considerable length at its point of bearing upon the pin 70. The purpose of this length is to produce a steadying effect upon the lever and to insure its accurate movement. This long bearing, however, is not essential, as I have found that the circular hub portion 30ª of the lever holds it very accurately and securely when the said hub portion lies flatly against the frame 46.

The bender-plate-carrying lever 25 is also pivotally supported by the pin 70. I preferably mount the elongated hub 73 thereof upon the exterior of the hub or sleeve 74. In like manner, this elongated sleeve or hub may be omitted and the circular hub portion 25ª may be made to lie closely against the face of the lever 30, or be separated therefrom by a washer 25ᵇ. In like manner, the washer 30ᵇ—shown in dotted lines—may space the lever 30 from the frame 46.

The affixing lever 30 carries the severing lever 33, which is pivotally mounted on the said affixing lever by means of a pin 75. The severing lever is provided with laterally projecting wings 76 to receive the pressure of the fingers of the operator.

The severing lever is held in its normal position with relation to the affixing levers, as shown in Fig. 1, by the tension of the spring 37. The lateral projection 34ª bears against the affixing lever at the point 34ᵇ and the movement caused by the tension of the spring 37 is thereby limited. The tension of this spring 37 is considerably greater than the tension of the spring 38, and when pressure is applied to the severing lever at 76, the affixing lever is carried downwardly with said severing lever.

The downward movement of the affixing lever is limited only by the envelop or package 23 which it strikes. When the affixing lever is thus stopped, further pressure on the end of the severing lever causes the latter to rotate about the pivot 75, and this rotary movement causes the lower cutting edge 34 to sever the adjacent portion of the ribbon from the first or end stamp 22. (See Fig. 4).

The affixing lever carries a pin 77, which is adapted to operate certain mechanism whereby the wiper 32 is moved across the gummed surface of the stamp during the latter portion of the downward movement of the affixing lever. This mechanism comprises a wiper lever 78, pivoted at 79 to the frame 46. The wiper 32 is preferably integral with an arm 80, which carries it and which is pivotally attached at 80$^a$ to the wiper lever 78.

The wiper arm 80 is drawn toward the wiper lever 78 by the tension spring 81, which is attached to said wiper arm at 82, and to the wiper lever at 83. The normal tendency, therefore, of the spring 81 is to move the wiper upwardly, and in the normal position of the parts the wiper is thereby held against the moisture-depositing wick 89.

The wiper 32 is provided with a laterally projecting lug 84, which is adapted to bear upon the lower edge 85 of the frame 46. This lower edge of the frame is given a curved form at 85 and 85$^a$, which thus has the nature of a cam. The shape of the curve is such as to properly guide the wiper into contact with the gummed surface of the stamp and to maintain said contact during its travel across the stamp while the latter is being moved downwardly by the affixing lever.

The small upwardly turned part 85$^a$ of the curve is for the purpose of permitting the wiper to come into close contact with the moisture-depositing device at the terminal of the return stroke.

The wiper lever 78 is given a curved form at 86, of such nature as will permit the pin 77 to impart to the lever the desired movement, which, in turn, will give to the wiper arm 80 the proper forward stroke above described. The curve 86 terminates in a radial portion 87, which permits the wiper lever to remain stationary during the extreme lower portion of the downward movement of the pin 77. During this part of the movement the pin will move along the line 87 without imparting any movement to the lever. During this time the wiper 32 will rest against the under surface of the curved part 85, adjacent its extreme right hand end.

The wiper lever is also provided with another straight portion 88, at the upper terminal of the curved surface 86. The purpose of this straight portion is to permit the pin 77 to slide thereon during the extreme upper portion of the movement of the affixing lever, without imparting any movement to the wiper lever. The two straight portions 87 and 88 will be seen to be so disposed as to permit of a period of rest for the wiper lever at each end of the downward movement of the affixing lever. In like manner, there will be a corresponding period of rest at each end of the upward movement of said lever. During the intermediate portion of the downward movement of the affixing lever, the wiper will be caused to move across the gummed surface of the stamp which is being operated upon by said affixing lever.

During this movement of the wiper across the gummed surface of the stamp, it is exerting a pressure thereon, due to the tension of the spring 81, and the stamp is thereby firmly held against the lower face of the affixing lever, and said lever is thereby enabled to securely engage the stamp. By this means the stamp is prevented from sliding away from the affixing lever.

The end of the wick 89 has a position directly above the wiper 32 in its normal position and leads therefrom into the water in the water-box 90. This water-box is provided with an upper wall, which projects over the wick at 90$^a$ to hold it firmly against the wiper.

The water-box is adjustable in its position with relation to the wiper, in order that a greater or lesser amount of the surface of the end of the wick may be caused to bear upon the wiper. By this means the quantity of moisture deposited upon the wiper may be regulated.

This adjustment consists in the movement of the water-box 90 in a horizontal direction from left to right, or in the reverse direction, and is effected by means of a thumb screw 91. This thumb screw is threaded through a supporting post 92 fixed to the framework. A lug 93 is fixed to the water-box, and washers or collars 94 and 95—disposed at opposite sides of the said lug and attached to the screw 91—permit the screw to impart the desired horizontal movement to the water-box.

In order to provide for varying thicknesses in different parts of the same envelop or package as it lies upon the base 24, I have provided a tilting portion in said base. If one portion of the envelop is thicker than another, the tilting portion 98 will rotate slightly under the pressure of the affixing lever. This will cause the upper surface of the envelop to be uniformly pressed upon by said affixing lever.

The tilting portion of the base comprises a plate 98, which is pivotally supported by pins 99 attached to downwardly projecting flanges 99$^a$, preferably integral with the base of the machine.

In the operation and use of my invention the operator first places a letter or package above the base 24, with one edge resting against the vertical portion 24$^a$ of the frame.

This will cause the letter to occupy the correct position for receiving the stamp.

He then presses the affixing lever and severing lever downwardly, by placing his hand or fingers upon the wings 76 of said severing lever. The pressure of his hand thus exerted will cause the said levers to move downwardly together, the tension of the spring 37 preventing the severing lever from moving with relation to the affixing lever.

While moving downwardly the under surface 31 of the laterally projecting part of the affixing lever and the lower surface of the lateral projection 34ᵃ of the severing lever 33 come into engagement with the face of the stamp 22. The tongue or finger 80ᵃ presses the stamp firmly against the levers and prevents the stamp from being drawn away from them.

The continued downward movement of the levers causes the ribbon to be drawn along in a feeding movement between the spring 59 and the lateral projection 28 of the bender-plate-carrying lever. The ribbon is also drawn through the rollers 26 and 27.

At about this point in the operation the pin 77 comes into engagement with the curved portion 86 of the wiper lever 78 and causes the wiper to begin its forward movement across the gummed face of the stamp. At about this same instant the pin 36 comes into engagement with the notch 65 in the lever 35, and the bender-plate 29 is caused to move upwardly, preparatory to a final feeding and positioning movement during the subsequent return movements of the affixing lever.

Figure 2:
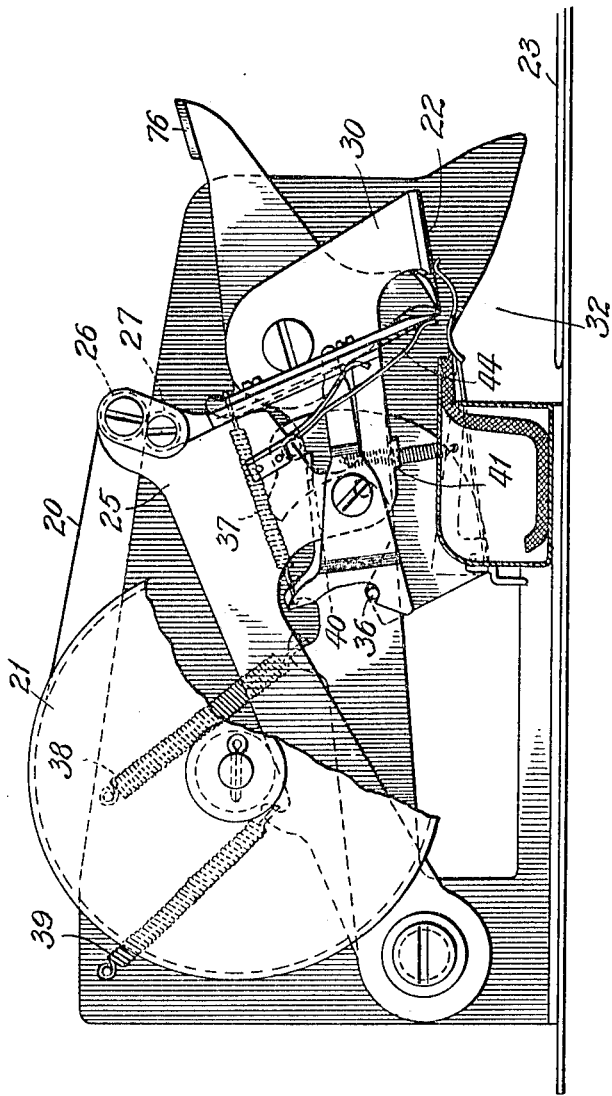
Fig. 2 is a side elevation of the same mechanism after the first step in the operation has been completed. This step comprises the movements from the normal position of the parts to the moment when the affixing lever reaches the first or end stamp of the ribbon.

The continued downward movement of the affixing and severing levers causes a continued feeding movement of the ribbon. The positions which the parts occupy when the affixing and severing levers have reached the stamp are shown in Fig. 2.

The affixing lever continues its downward movement until the lug 40 thereon meets the lug 41 on the bender-plate carrying lever. The positions of the parts at this moment are shown in Fig. 3. It will be seen that the wiper has moved entirely across the gummed face of the stamp and is resting upon the extreme lower right hand end of the cam face 85 of the frame. At this moment the pin 77 has reached the straight portion 87 at the edge of the wiper lever 78, and no further movement of said lever will be caused by the continued downward movement of the pin 77. In like manner, the pin 36 will be seen to have emerged from the notch 65 and to be sliding upon the straight portion 66 of the lever 35. No further movement of the lever 35 will therefore be caused by the continued downward movement of the pin 36. The bender-plate 29 will therefore remain in its elevated position until a return movement of the pin causes it to engage the curved shoulder 64ᵇ of said lever 35.

The further and final downward movement of the affixing lever and severing lever causes them to press the stamp 22 upon the envelop 23. During this part of the movement the lever 25 is also moved downwardly. It will now be seen that the downward movement of the affixing lever is arrested. A continued pressure of the operator's fingers upon the end 76 of the severing lever will cause an oscillation thereof about its pivot 75, and the extreme lower edge 34, or cutting edge, will be caused to sever the remaining portion of the ribbon 20 from the stamp 22, which latter is at this moment being firmly held in contact with the envelop 23. The end 43 of the ribbon will thus be separated from the edge 42 of the stamp 22, and the small spring finger 44 will cause the end of the ribbon to be pressed forwardly over the laterally projecting portion 34ᵃ of the severing lever. The rotary movement of the severing lever may be stopped by the contact of the edge 34 with the water-box, or by any other suitable stop.

The stamp is now affixed to the envelop, and the downward movement of all the parts is terminated. This position of the parts is shown in Fig. 4.

In the return movement of the parts, the severing lever will promptly return to its normal position with relation to the affixing lever. This will be due to the preponderating tension of the spring 37 with relation to the spring 39.

This movement of the severing lever will cause the lateral projection 34ᵃ thereof to strike the gummed face of the stamp 22ᵃ, or the end stamp of the ribbon 20 now remaining. The continued movement of the lever will cause it to bend the stamp 22ᵃ along the line of perforations to the angular position previously occupied by the stamp 22, as above described. I have found that this bending action is very easily performed when the gummed surface occupies the outer side of the bend. In other words, when the gummed surface is on the tension side in the operation of bending, the said bending promptly occurs at the line of perforations, even though the adjacent parts of the ribbon are not held or supported by any member of the mechanism in close proximity to said line of perforations. This is the condition that obtains in the mechanism described. It will be seen that the gummed surface of the stamp is struck by the lateral projection 34ᵃ, which bends it in the manner above described.

The return movement of the parts is now quickly effected by the springs 38 and 39. During the upward movement the pin 77 comes into engagement with the straight portion 88 of the wiper lever 78 and restores it to its normal position. This causes the wiper 32 to be drawn back into engagement with the moisture-depositing wick 89. During this return movement of the wiper 32, the small tongue or finger 80$^a$ bears upon the under or gummed face of the stamp 22$^a$ and prevents its becoming bent back to its former position by the downward pressure of the bender plate 29. During the upper or final portion of the return movement of the pin 36 it strikes the shoulder 64$^b$, causing an oscillation of the lever 35 and the downward movement of the bender-plate. This downward movement of the bender-plate causes it to effect a final feeding movement and positioning of the ribbon 20 and stamp 22$^a$.

During the upward movement of the parts the lever 25 is stopped by any suitable means, and in the drawings it is shown as bearing upon the under side of the enlarged portion of the pin 45, which thus serves as a stop. In like manner, the affixing lever 30 may be stopped in its upward movement by the pin 45, or by the downward projection 45$^a$ thereof, or other suitable means.

In the modification shown in Figs. 17, 18 and 19 I have omitted the wiper 32 and its forwardly projecting tongue 80$^a$ by which the stamp 22 is held in close contact with the affixing lever. I have found that I can allow the stamp 22 to strike the envelop 23 at its lower extremity, and that the said envelop will retain the stamp in an angular position to a sufficient extent to permit the desired engagement of the severing lever therewith. In order to permit this, I proportion the parts in such manner that the space between the base of the machine and the affixing and severing levers at the time of their engagement with the stamp will be less than in the form previously described. I provide teeth 34$^b$ at the edge of the severing lever which are adapted to enter the perforations between the stamps.

As a further modification I have changed the wire finger 44 to a flat member 44$^a$ having a width substantially equal to that of the ribbon of stamps. I have made this finger 44$^a$ of a little greater length than the finger 44 and have added the slots 44$^c$ thereto. The remaining tongues 44$^b$ project below and forwardly of the bender-plate 29. I preferably modify the bender-plate 29 also in the matter of reducing its length to permit a free coöperation between the severing lever and said tongues. I have also added the slots 29$^a$ to the bender-plate 29, as shown in Fig. 5.

With the modifications of the parts shown in Figs. 17, 18 and 19, the lower edge of the severing lever is adapted to engage the ribbon of stamps and press it against the finger 44$^a$ at a point in the curvature thereof indicated by the reference numeral 44$^d$. The teeth 34$^b$ will enter the perforations between the stamps and a continued downward movement of the severing lever will cause it to effect a feeding movement of the ribbon of stamps. During this part of the operations the lowermost stamp 22 will assume a position about as shown in the dotted lines 22$^x$. The continued movement of the severing lever will cause it to move around the rounded ends of the tongues 44$^b$ until the lower extremity of the stamp strikes the envelop 23 or the base of the machine, as the case may be, as shown at 22$^y$. This will arrest the angular movement of the stamp and a continued downward movement of the severing lever will cause the stamp to assume a bent position, as shown in dotted lines at 22$^z$. During this bending action the forward end of the stamp will slide along the envelop toward a horizontal position ready to receive the pressure of the affixing lever 30. The stamp is then in position to be severed by the severing lever and from this point on the operations will continue in the same manner as described before.

I have further found that in the return movements the end of a new stamp will strike the upper surface 31$^a$ of the laterally projecting portion 31 of the affixing lever. This is shown by the dotted lines 22$^w$. The operation of bending the stamp to its angular position is, therefore, performed by the laterally projecting portion 31 very largely instead of by the severing lever in its return movement.

If the envelop, or like package, varies in thickness in different parts, the plate 98 will tilt sufficiently to permit the affixing lever to bear with a uniform pressure upon its upper surface.

In case it is desired to deliver stamps unmoistened or in a dry condition, it is necessary only to operate the screw 91 in such a direction as to draw the water-box away from the wiper. When the end of the wick at 89 is far enough away from the wiper in the normal position of the latter to prevent depositing of water on it, the stamps will be delivered dry. The affixing lever will then press the dry stamp against the base of the machine, provided an envelop or other object is not inserted. In all other respects the machine will operate in the manner previously described.

While I have described my invention more or less minutely and as being embodied in certain precise forms, I do not wish to be understood as limiting myself unduly thereto. On the contrary, I contemplate changes in form, construction, and proportion of parts, and the substitution of equivalents as circumstances may suggest or render expedient, without departing from the spirit of my invention.

I claim:

1. In a machine of the class described, means for engaging a stamp, or the like, of a series in ribbon form, for imparting thereto a feeding movement, and a resisting element in the path of said stamp and said means adapted to receive the pressure thereof subsequent to the feeding movement.

2. In a machine of the class described, means adapted to bend a stamp, or the like, of a series thereof having the form of a ribbon to a position forming an angle with said series, means adapted to engage said stamp and to impart to said series a feeding movement, a resisting element against which said means is adapted to press said stamp, and means for moistening the gummed side of said stamp.

3. In a machine of the class described, means for bending a stamp or the like, of a series thereof having the form of a ribbon to a position forming an angle with said series, means adapted to flatly engage one side of said stamp, means adapted to engage the opposite side of said stamp and produce a yieldable pressure thereon, and a yielding pressure element lying in the path of said first engaging means.

4. In a machine of the class described, means for bending a stamp, or the like, of a series thereof having the form of a ribbon to a position forming an angle with said series, an affixing member adapted to flatly engage the face of said stamp, a movable wiping member adapted to engage the gummed side of said stamp and produce a yieldable pressure thereon, and a resisting element lying in the path of said affixing member.

5. In a machine of the class described, means for bending a stamp, or the like, of a series thereof having the form of a ribbon to a position forming an angle with said series, an affixing member adapted to flatly engage the face of said stamp, a movable wiping member adapted to engage the gummed side of said stamp and produce a yieldable pressure thereon, a moisture-supplying element for said wiping member, and a resisting element lying in the path of said affixing member.

6. In a machine of the class described, means for bending a stamp, or the like, of a series thereof having the form of a ribbon to a position forming an angle with said series, an affixing member adapted to flatly engage the face of said stamp, a movable wiping member adapted to engage the gummed side of said end stamp and produce a yieldable pressure thereon, a moisture-supplying element for said wiping member, a resisting element lying in the path of said affixing member, and means for severing said stamp from said ribbon.

7. In a machine of the class described, an affixing member adapted to engage a stamp of a series having the form of a ribbon and to cause a feeding movement thereof, a severing element carried by said affixing member and adapted to sever the remaining portion of said series of stamps from said stamp when the movement of said affixing member is arrested, and a retractive element for restoring said affixing member to its normal position.

8. In a machine of the class described, an affixing member adapted to engage a stamp of a series having the form of a ribbon and to cause a feeding movement thereof, a severing element carried by said affixing member and adapted to sever the remaining portion of said series of stamps from said stamp when the movement of said affixing member is arrested, said severing element being adapted to receive the actuating force and to transmit said force to said affixing member, and a retractive element for restoring said affixing member to its normal position.

9. In a machine of the class described, an affixing member adapted to engage a stamp of a series having the form of a ribbon and to cause a feeding movement thereof, a severing element carried by said affixing member and adapted to sever the remaining portion of said series of stamps from said stamp when the movement of said affixing member is arrested, said severing element being adapted to receive the actuating force and to transmit said force to said affixing member, a retractive element adapted to maintain the normal relation of said affixing element and said severing element until the movement of said affixing element is arrested and to restore said relation when the actuating force is removed, and a retractive element for restoring said affixing member to its normal position.

10. In a machine of the class described, an affixing element adapted to engage a stamp of a series having the form of a ribbon and to cause a feeding movement thereof, and a severing element movably attached to said affixing element and forming a part thereof, said severing element being adapted to move away from said affixing element and sever the adjacent portion of the ribbon from said stamp when the movement of said affixing element is arrested.

11. In a machine of the class described, an affixing element adapted to engage a stamp of a series having the form of a ribbon and to cause a feeding movement thereof, and a severing element movably attached to said affixing element and forming a part thereof, said severing element being adapted to move away from said affixing element and to sever the adjacent portion of the ribbon from said stamp when the movement of said affixing element is arrested, said severing element being also adapted to bend a stamp of the remaining portion of said ribbon to an angular position with relation thereto.

12. In a machine of the class described, an affixing element adapted to engage a stamp of a series having the form of a ribbon and to cause a feeding movement thereof, a severing element movably attached to said affixing element and forming a part thereof, said severing element being adapted to move away from said affixing element and to sever the adjacent portion of the ribbon from said stamp when the movement of said affixing element is arrested, said severing element being also adapted to bend a stamp of the remaining portion of said ribbon to an angular position with relation thereto when returning to its normal position with relation to said affixing element, and means for causing the return of said severing element to said normal position.

13. In a machine of the class described, an affixing element adapted to engage a stamp of a series having the form of a ribbon and to cause a feeding movement thereof, a severing element movably attached to said affixing element and forming a part thereof, said severing element being adapted to move away from said affixing element and to sever the adjacent portion of the ribbon from said stamp when the movement of said affixing element is arrested, said severing element being also adapted to bend another stamp of the remaining portion of said ribbon to an angular position with relation thereto, and means for retaining said second named stamp in said angular position until severed from said ribbon.

14. In a machine of the class described, an affixing element adapted to engage a stamp of a series having the form of a ribbon and to cause a feeding movement thereof, a severing element movably attached to said affixing element and forming a part thereof, said severing element being adapted to move away from said affixing element and to sever the adjacent portion of the ribbon from said stamp when the movement of said affixing element is arrested, said severing element being also adapted to bend another stamp of the remaining portion of said ribbon to an angular position with relation thereto, means for retaining said second named stamp in said angular position until severed from said ribbon, and means for causing said retaining means to move across the gummed side of said second named stamp.

15. In a machine of the class described, an affixing element adapted to engage a stamp of a series having the form of a ribbon and to cause a feeding movement thereof, a severing element movably attached to said affixing element and forming a part thereof, said severing element being adapted to move away from said affixing element and to sever the adjacent portion of the ribbon from said stamp when the movement of said affixing element is arrested, said severing element being also adapted to bend another stamp of the remaining portion of said ribbon to an angular position with relation thereto, means for retaining said second named stamp in said angular position until severed from said ribbon, means for causing said retaining means to move across the gummed side of said second named stamp, said retaining means having a moisture-carrying portion, and means for depositing moisture on said portion.

16. In a machine of the class described, an affixing element adapted to engage a stamp of a series having the form of a ribbon and to cause a feeding movement thereof, a severing element movably attached to said affixing element and forming a part thereof, said severing element being adapted to move away from said affixing element and sever the adjacent portion of the ribbon from said stamp when the movement of said affixing element is arrested, said severing element being also adapted to bend another stamp of the remaining portion of said ribbon to an angular position with relation thereto, means for retaining said second named stamp in said angular position until severed from said ribbon, means for causing said retaining means to move across the gummed side of said bent stamp, said retaining means having a moisture carrying portion, means for depositing moisture on said portion, and means for adjusting said moisture-depositing means with relation to said carrying portion.

17. In a machine of the class described, an affixing element adapted to engage a stamp of a series having the form of a ribbon and to cause a feeding movement thereof, a severing element movably attached to said affixing element and forming a part thereof, said severing element being adapted to move away from said affixing element and sever the adjacent portion of the ribbon from said stamp when the movement of said affixing element is arrested, said severing element being also adapted to bend another stamp of the remaining portion of said ribbon to an angular position with relation thereto, means for retaining said second named stamp in said angular position until severed from said ribbon, means for causing said retaining means to move across the gummed side of said second named stamp, said retaining means having a moisture-carrying portion, means for depositing moisture on said portion, means for adjusting said moisture-depositing means with relation to said carrying portion, and means for supporting an envelop, package, or the like, in the path of said affixing element.

18. In a machine of the class described, an affixing element adapted to engage a stamp of a series having the form of a ribbon and to cause a feeding movement thereof, a severing element movably attached to said affixing element and forming a part thereof, said severing element being adapted to move away from said affixing element and sever the adjacent portion of the ribbon from said stamp when the movement of said affixing element is arrested, said severing element being also adapted to bend another stamp of the remaining portion of said ribbon to an angular position with relation thereto, means for retaining said second named stamp in said angular position until severed from said ribbon, means for causing said retaining means to move across the gummed side of said second named stamp, said retaining means having a moisture-carrying portion, means for depositing moisture on said portion, means for adjusting said moisture-depositing means with relation to said carrying portion, and means supporting an envelop, package, or the like, in the path of said affixing element, said supporting means being adapted to move to an angular position with relation to said affixing means.

19. In a machine of the class described, means for holding a coil of stamps or the like having the form of a ribbon, means for holding the end portion in position to be operated upon by feeding mechanism, a secondary bending element around which the first or end stamp of said ribbon may be bent, a primary bending element for performing the bending operation, a tension member adapted to bear upon one side of said ribbon opposed to said secondary bending element and to press said ribbon to a position between said primary and said secondary bending elements.

20. In a device of the class described, the combination of means for holding a supply of stamps in the form of a ribbon, means for feeding said ribbon and affixing the end stamp thereof to an envelop, means supporting said ribbon adjacent the end stamp and adapted to move said ribbon, coöperating means between said affixing means and said moving means whereby said moving means is positively actuated by the affixing means when the latter is moved into engagement with the former, substantially as described.

21. In a machine of the class described, the combination of means for holding a supply of stamps or the like in the form of a ribbon, means for feeding said ribbon, means for affixing the end stamp thereof to an envelop or the like, means movably supported for engaging an intermediate portion of said ribbon adjacent the said end stamp, said movable means adapted for movement by the affixing means immediately preceding the affixing of said end stamp, substantially as described.

22. In a machine of the class described, the combination of means for holding a supply of stamps or the like in the form of a ribbon, means for feeding said ribbon, means for affixing the end stamp thereof to an envelop or the like, means for movably supporting an intermediate portion of the ribbon adjacent said end stamp, said movable means adapted for engagement and movement by said affixing means immediately prior to the affixing of said stamp, and a means for retracting said supporting means, substantially as described.

23. In a machine of the class described, means for holding a series of stamps having the form of a ribbon, means for bending the first or end stamp at an angle to said ribbon, and means for engaging said end stamp and moving said ribbon with relation to said holding means, said engaging means being also adapted to move said stamp toward and against an envelop or the like.

24. In a machine of the class described, means for holding a series of stamps having the form of a ribbon, means for bending the first or end stamp at an angle to said ribbon, and means for engaging said end stamp and moving said ribbon with relation to said holding means, said engaging means being also adapted to move said stamp toward and against a pressure-receiving element in said machine.

25. In a machine of the class described, means for holding a series of stamps having the form of a ribbon, a secondary bending element around which a stamp may be bent, a primary bending element for pressing said stamp around said secondary bending element, and means for pressing said stamp between said bending elements.

26. In a machine of the class described, means for holding a series of stamps having the form of a ribbon, a secondary bending element around which a stamp may be bent, a primary bending element for pressing said stamp around said secondary bending element, and means for pressing said stamp between said bending elements, said secondary element being movable and adapted to engage said stamp and effect a feeding and positioning movement thereof.

27. In a machine of the class described, means for holding a supply of stamps having the form of a ribbon, guiding means for said ribbon, yieldable holding means for the end portion of said ribbon, and means for engaging the end portion of said ribbon and drawing it through said yieldable holding means.

28. In a machine of the class described, means for holding a supply of stamps having the form of a ribbon, guiding means for said ribbon, yieldable holding means for the end portion of said ribbon, means for engaging the end portion of said ribbon and drawing it through said yieldable holding means, and means for affixing a stamp of said ribbon to an envelop or the like.

29. In a machine of the class described, means for holding a supply of stamps having the form of a ribbon, guiding means for said ribbon, yieldable holding means for the end portion of said ribbon, said holding means being also movable, means for engaging the end portion of said ribbon and drawing it through said yieldable holding means, and means for affixing a stamp of said ribbon to an envelop or the like, said affixing means being adapted to engage and move said holding means during the latter part of its affixing movement.

30. In a machine of the class described, means for holding a supply of stamps having the form of a ribbon, yieldable holding means for the end portion of said ribbon, said yieldable holding means being also movable, and means for guiding said ribbon from said supply to said yieldable holding means, said guiding means being mounted on said yieldable and movable holding means.

31. In a machine of the class described, means for yieldably holding the end portion of a supply of stamps having the form of a ribbon, means for engaging a stamp of said ribbon and drawing it through said yieldable holding means, and means carried by said holding means for adjusting said stamp in said holding means with relation to said engaging means.

32. In a machine of the class described, means for yieldably holding the end portion of a supply of stamps having the form of said ribbon, means for engaging a stamp of said ribbon and drawing it through said yieldable holding means, and means carried by said holding means for adjusting said stamp in said holding means with relation to said engaging means, said engaging means being adapted to actuate said adjusting means.

33. In a machine of the class described, means for yieldably holding the end portion of a supply of stamps having the form of a ribbon, means for engaging a stamp of said ribbon and drawing it through said yieldable holding means, and means carried by said holding means for adjusting said stamp in said holding means with relation to said engaging means, said adjusting means being also adapted to serve as a bending element around which said stamp is bent to a position forming an angle with said ribbon.

34. In a machine of the class described, means for yieldably holding the end portion of a supply of stamps having the form of a ribbon, means for engaging a stamp of said ribbon and drawing it through said yieldable holding means, and means carried by said holding means for adjusting said stamp in said holding means with relation to said engaging means, said adjusting means being also adapted to serve as a bending element around which said stamp is bent to a position forming an angle with said ribbon, said engaging means also being adapted to serve as an opposing bending element.

35. In a machine of the class described, means for yieldably holding the end portion of a supply of stamps having the form of a ribbon, means for engaging a stamp of said ribbon and drawing it through said yieldable holding means, and means carried by said holding means for adjusting said stamp in said holding means with relation to said engaging means, said adjusting means being also adapted to serve as a bending element around which stamp is bent to a position forming an angle with said ribbon, said engaging means also being adapted to serve as an opposing bending element and as a severing element by which the adjacent portion of said ribbon is severed from a stamp.

36. In a machine of the character described, means for feeding a series of stamps having the form of a ribbon, and a resisting element in the path of said ribbon adapted to cause a stamp thereof to bend at an angle to said ribbon.

37. In a machine of the character described, means for feeding a series of stamps having the form of a ribbon, a resisting element in the path of said ribbon adapted to cause a stamp thereof to bend at an angle to said ribbon, and means for pressing said stamp against said resisting element.

38. In a machine of the character described, means for feeding a series of stamps having the form of a ribbon, a resisting element in the path of said ribbon adapted to cause a stamp thereof to bend at an angle to said ribbon, means for pressing said stamp against said resisting element, and means for severing said stamp from the adjacent portion of the ribbon while under pressure.

39. In a machine of the character described, means for yieldably holding a series of stamps or the like having the form of a ribbon, means for pressing the end stamp of said ribbon away from the line of direction of said ribbon as it leaves said holding means, and means coöperating with said second named means for engaging said stamp and producing a feeding movement of said ribbon.

40. In a machine of the character described, means for yieldably holding a series of stamps or the like having the form of a ribbon, means for pressing the end stamp of said ribbon away from the line of direction of said ribbon as it leaves said holding means, means coöperating with said second named means for engaging said stamp and producing a feeding movement of said ribbon, and a resisting element against which said stamp is moved by said engaging means to bend said stamp at an angle to said ribbon, and means for pressing said stamp against said resisting element and severing said stamp from the adjacent portion of the ribbon while under the pressure of said means.

In testimony whereof, I have subscribed my name.

GEORGE L. REICHHELM.

Witnesses:
   Geo. L. Wilkinson,
   Anna L. Walton.

Copies of this patent may be obtained for five cents each, by addressing the "Commissioner of Patents, Washington, D. C."